United States Patent [19]

Mochizuki et al.

[11] Patent Number: 5,247,375
[45] Date of Patent: Sep. 21, 1993

[54] DISPLAY DEVICE, MANUFACTURING METHOD THEREOF AND DISPLAY PANEL

[75] Inventors: Yasuhiro Mochizuki, Katsuta; Takashi Aoyama, Ibaraki, both of Japan

[73] Assignee: Hitachi, Ltd., Tokyo, Japan

[21] Appl. No.: 986,893

[22] Filed: Dec. 8, 1992

Related U.S. Application Data

[63] Continuation-in-part of Ser. No. 667,650, Mar. 11, 1991, abandoned.

[30] Foreign Application Priority Data

Mar. 9, 1990 [JP] Japan .................................. 2-56372
Jun. 15, 1990 [JP] Japan ................................ 2-155200

[51] Int. Cl.$^5$ ........................................... G02F 1/133
[52] U.S. Cl. ........................................ 359/54; 359/85; 257/59
[58] Field of Search ................. 359/54, 56, 59, 85; 357/23.7, 4, 23.5; 257/162, 178, 59, 730

[56] References Cited

U.S. PATENT DOCUMENTS 4,668,970  5/1987  Yatsuda et al. ................... 357/23.5
5,076,667 12/1991  Stewart et al. ........................ 359/54

FOREIGN PATENT DOCUMENTS 59-10988  1/1984  Japan .
60-26932  2/1985  Japan .
0038423   2/1987  Japan .................................. 359/53
63-223788 9/1988  Japan .
64-2088   1/1989  Japan .
64-45162  2/1989  Japan .

Primary Examiner—William L. Sikes
Assistant Examiner—Huy K. Mai
Attorney, Agent, or Firm—Antonelli, Terry, Stout & Kraus

[57] ABSTRACT

A display device such as a liquid crystal display device is provided which comprises a single substrate, a plurality of thin film semiconductor elements provided on the substrate, a plurality of display elements whose pixel display is controlled by the semiconductor elements, and electrodes for driving the display elements. The substrate includes a display zone having the thin film semiconductor elements arranged in the display elements as well as a non-display zone. The non-display zone has a display scan drive circuit area and a display signal drive circuit area. The thin film semiconductor elements are formed in the both zones. A distance between the display signal drive circuit area and the semiconductor elements of the display zone on the substrate is physically arranged so as be larger than a distance between the display scan drive circuit area and the semiconductor elements of the display zone. In the display device, the multiplicity of semiconductor elements are formed on a glass substrate having one side of several or more inches so that minimum processing dimensions of the semiconductor elements in the display zone are smaller than those in the non-display zone.

25 Claims, 9 Drawing Sheets

PERIPHERAL CIRCUIT TFT

PIXEL AREA TFT

DISPLAY DEVICE, MANUFACTURING METHOD THEREOF AND DISPLAY PANEL

This application is a continuation of application Ser. No. 07/667,650, filed on Mar. 11, 1991 now abandoned.

BACKGROUND OF THE INVENTION

The present invention generally relates to display devices, methods for manufacturing the display devices and display panels for use therein and, more particularly, to a display device which is suitable for liquid crystal display, a manufacturing method and a display panel.

There has been a tendency that a liquid crystal display device is made larger in screen size and higher in definition. The former requires a substrate itself to be made larger, while the latter requires the reduction of pixel size and processing dimensions. The larger-scale and higher-definition display device involves technically increased difficulties and remarkable reduction of its yield in manufacturing the display device. In an attempt to increase the display yield redundancy is provided to the constituent elements of the display device, as disclosed, for example, in JP-A-57-49997. However, a method for incorporating a driver circuit in a peripheral area of a display device to reduce its cost as disclosed in JP-A-59-10988, in particular, has a problem that, since a defect in the peripheral circuit causes appearance of a line defect on the display screen, it becomes very important to improve the yield of the peripheral circuit. In the above prior art technique of JP-A-57-49997 for providing redundancy, the redundancy application is used mainly for the display area, i.e., pixel area of the display device but it is also used for improving the yield of the peripheral circuit. However, the formation of the peripheral circuit usually requires a high temperature process when compared with the formation of the pixel area, thus blocking the realization of a high yield.

In a display device of JP-A-63-223788, for the purpose of improving the characteristics of a peripheral circuit incorporated therein, a scan drive circuit is made of amorphous silicon while a signal drive circuit is made of polycrystalline silicon. However, any consideration is not paid to the improvement of the overall yield of the display device.

In JP-A-1-45162, in order to enhance the yield of a display device incorporating a peripheral circuit, a device is taken wherein a photo-lithography process is used to separate a silicon film prior to a laser annealing process, but no consideration is paid to the structure of the display device.

As a prior art TFT (thin film transistor) panel for use in a liquid crystal display device, for example, JP-A-64-2088 or JP-A-60-26932 disclose an active matrix panel which incorporates a peripheral circuit and wherein TFT elements for respective pixels and the peripheral circuit for driving the TFT elements are formed on the same substrate.

Further known as in JP-A-63-186216 or JP-A-61-121034 is another large-scale TFT panel wherein a plurality of TFTs are positioned within each of pixels for the purpose of applying redundancy to the large-scale panel and improving the yield of the panel.

JP-A-61-180275 also discloses a method for manufacturing a large-scale TFT panel which employs a divisional light exposure process. In this prior art, however, no consideration is paid to making full use of the respective characteristics of the TFTs for the pixel area and the peripheral circuit area.

In the prior art techniques, in addition, individual considerations have been paid to the yield improvement of the pixel area and the yield improvement of the peripheral circuit, but such consideration has not been sufficiently taken of how to improve the yield taking into account the differences in characteristic and manufacturing process between the peripheral circuit and pixel area and also taking into account the influences of the differences in characteristic and manufacturing process between the pixel area, scan drive circuit and data drive circuit on the arrangement of the display device.

SUMMARY OF THE INVENTION

It is an object of the present invention to provide a display device which comprises a panel having a pixel area and a peripheral circuit integrally formed therein and can improve its manufacturing yield and/or characteristics, and a method for manufacturing the display device.

Another object of the present invention is to provide a display device which can facilitate realization of large scale display screen and a high definition, a display panel for use in the display device and a method for manufacturing these device and panel.

A further object of the present invention is to provide a display panel which has pixel TFTs and peripheral circuit TFTs suitably arranged therein and exhibits excellent characteristics suitable for such a device as a liquid crystal display device.

Yet a further object of the present invention is to provide a method for manufacturing efficiently a large-scale TFT panel with an excellent pattern accuracy.

In accordance with an aspect of the present invention, the above objects are achieved by providing a display device which comprises at least one substrate; a plurality of semiconductor elements formed on the substrate; and a display panel controlled by the plurality of semiconductor elements; wherein the substrate is divided into a display zone and a non-display zone other than the display area, the plurality of semiconductor elements are formed in the display zone and the non-display zone, and minimum processing dimensions of the semiconductor elements formed in the display zone are differently set to be smaller than minimum processing dimensions of the semiconductor elements formed in the non-display zone.

In accordance with another aspect of the present invention, there is provided a method of manufacturing a display device which comprises the steps of preparing at least one substrate; dividing the substrate into a display zone and a non-display zone and forming a plurality of semiconductor elements respectively in said zones, formation of the semiconductor elements in the display zone being carried out by a divisional light exposure process and formation of the semiconductor elements in the non-display zone being subjected to a batch light exposure process; and forming a display panel to be controlled by the semiconductor elements of the display zone.

In accordance with a further aspect of the present invention, there is provided a display panel which comprises at least one substrate and a plurality of semiconductor elements formed in the substrate, and wherein the substrate is divided into a display zone and a non-display zone other than the display zone, the plurality of semiconductor elements are formed in the display zone and the non-display zone, minimum processing dimensions of the semiconductor elements formed in the display zone are set to be smaller than minimum processing dimensions of the semiconductor elements formed in the non-display zone.

In accordance with yet a further aspect of the present invention, there is provided such a display device as a liquid crystal display device which comprises a pixel area and a peripheral circuit, wherein the peripheral circuit includes a data drive circuit area and a scan drive circuit area, and the pixel area, data drive circuit area and scan drive circuit area are arranged so that a distance $d_2$ between the data drive circuit area of the peripheral circuit and the pixel area is larger than a distance $d_1$ between the scan drive circuit area and the pixel area, that is, so as to satisfy a relationship of $d_2 > d_1$ or relationships of $d_2 \geq 900$ μm and $d_1 \geq$ μm.

DESCRIPTION OF THE PREFERRED EMBODIMENTS

Figure 1A:
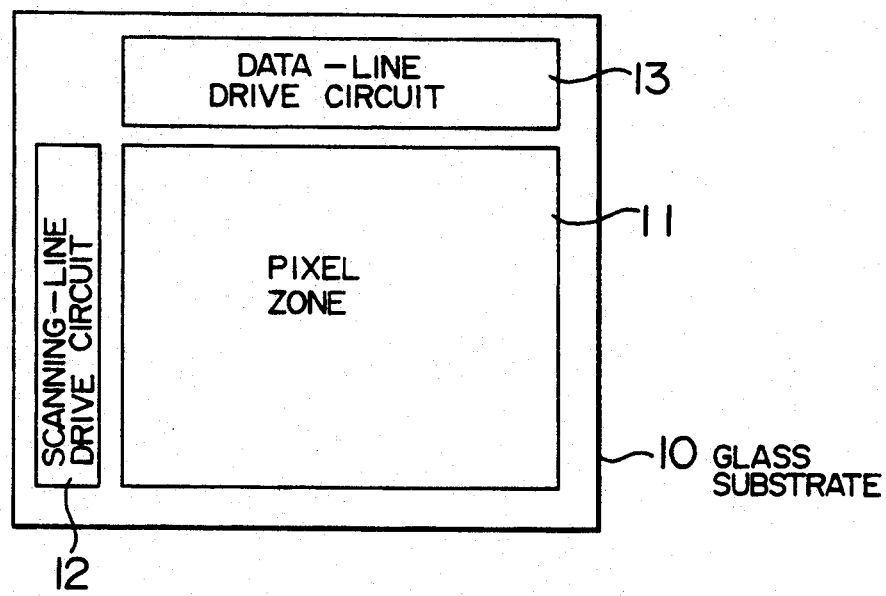
FIGS. 1A and 1C show, in a model form, TFT panels for explaining an embodiment of the present invention.

Prior to explanation of embodiments of the present invention, the detailed concept and derivation process of the present invention will be referred to. The basic concept of the present invention lies in forming microprocessing rules of TFTs for a pixel area smaller than those of TFTs for a peripheral circuit area. The fine-patterning rules used herein means minimum processing dimensions (including the size of Si islands, the widths and lengths of gates, and the widths of wiring layers) for forming TFTs and allowance dimensions for mask alignment.

To this end, in a photolithographic process of the manufacturing processes of the present invention, the peripheral circuit area having relatively large patterning rules is subjected to a batch light exposure while the pixel area having relatively small patterning rules is subjected to a divisional light exposure.

A peripheral-circuit-incorporated active matrix panel for use in a liquid crystal display device comprises a pixel area and a peripheral circuit area which has the following features ①  ② and ③.

① As the TFT dimensions of the pixel area are made smaller, an aperture ratio can be set larger and thus a clearer picture image can be obtained. This tendency is increasingly demanded for high definition display equipments. Meanwhile, the peripheral circuit area, which is less limited by the restrictions of the TFT processing dimensions, can use relatively large elements.

② As will be described later in connection with FIGS. 1B and 1C, the pixel area has a two-dimensional repetition of identical patterns and thus can be fine-patterned by dividing the photolithographic process per board into a plurality of sub-processes and repeating alignment and light exposure. The peripheral circuit area, on the other hand, has a less repetition of identical patterns such as leading wire regions, which requires replacement of a photo mask for every divisional light exposure, whereby a workability is deteriorated. For this reason, it is desirable that the peripheral circuit zone of the board corresponding to one panel can be subjected to a batch light exposure, that is, a single alignment and light exposure process.

③ According to TFT characteristics, as the dimensions of TFTs in the pixel area are made smaller, the leakage current (off current) can be made smaller and the resultant picture image can be made more clear. Meanwhile, when the peripheral circuit area is made large in the dimensions of its TFTs to provide a high breakdown voltage between the source and drain of each TFT, its drivability can be increased.

④ For the board for use in the TFT panel, a glass substrate having a strain point of about 550°–650° C. is usually employed. The glass substrate is subjected to a deformation during a thermal process of the manufacturing processes. Crook or war page and shrinkage, in particular, are serious problems because they involve a large shift in the peripheral dimensions of the glass substrate. Since the pixel area is disposed in the center of the glass substrate, the pixel area can be easily fine-patterned and the TFT dimensions can be also made small; whereas, since the peripheral circuit area is disposed at the peripheral part of the glass substrate, the TFT processing dimensions are required to be made preferably large for easy pattern alignment.

Figure 1B:
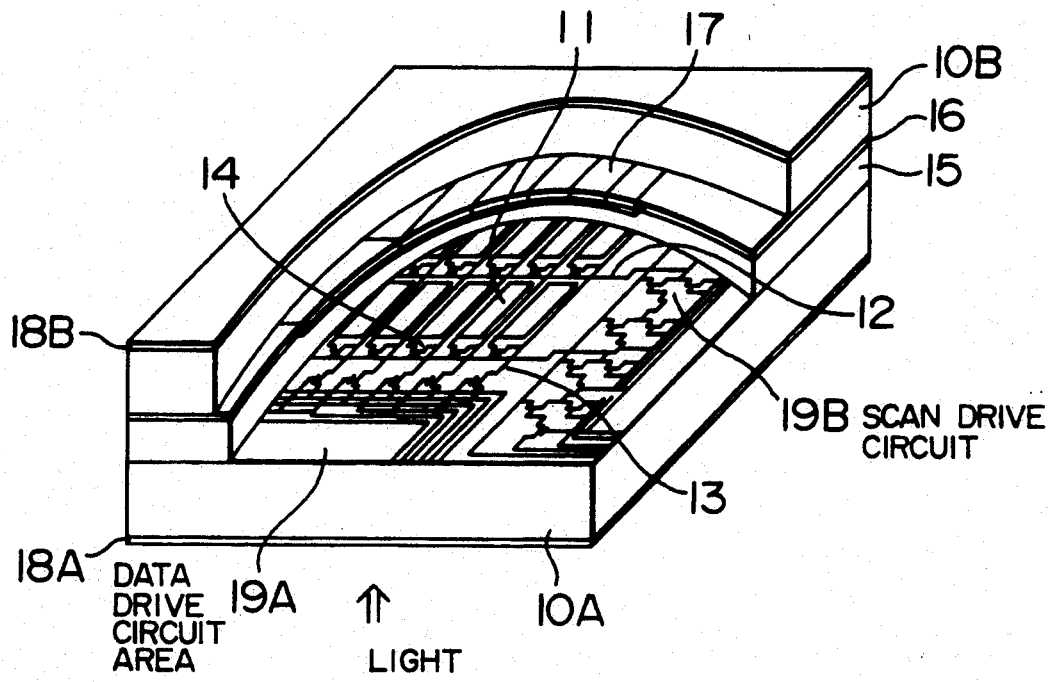
FIG. 1B is a partially cut-away perspective view of a color display device to which a liquid crystal display panel is applied.
Figure 1C:
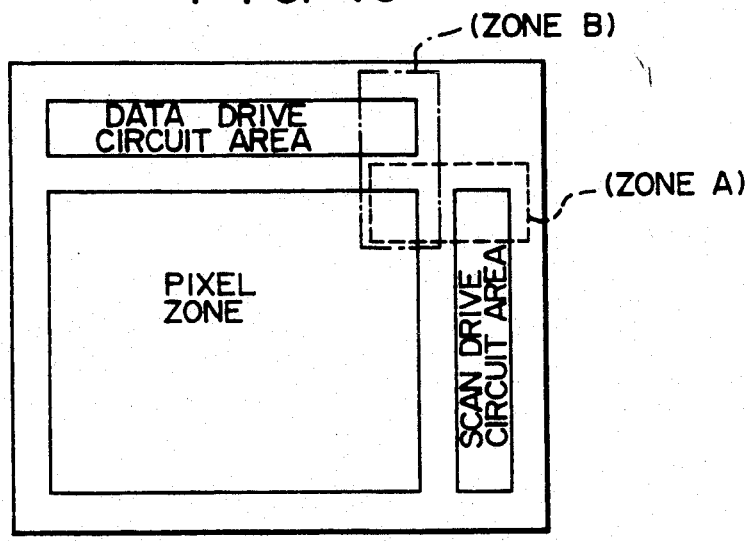

FIGS. 1A to 1C show a plan model view of a TFT board of liquid crystal display incorporating a peripheral circuit in accordance with an embodiment of the present invention, a partially cut-away perspective view of the same, a plan pattern thereof and a perspective cross-sectional view of a color liquid crystal display unit, respectively. In the drawings, a glass substrate 10 has a strain point of 645° C. and dimensions of 60 mm long, 60 mm wide and 1.1 mm thick, as its specifications. A pixel area 11 as a display area is provided in the form of a matrix of TFTs corresponding to pixel switches. More in detail, the pixel area 11 measures 48 mm long × 36 mm wide, and comprises a total of 690,000 dots of 960 dots in row and 720 dots in column, each pixel dot having a size of 50 μm square. Provided in each pixel are polycrystalline silicon TFTs each having a minimum size of 3 μm square. Each TFT of a MOS type has a gate length of 10 μm square, and a gate width of 3 μm as its processing dimensions. Peripheral circuit areas 12 and 13 for driving the pixel TFTs, which correspond to areas other than the display area 11, contain about 20,000 of polycrystalline silicon TFTs each having a minimum size of 6 μm square. More specifically, the scanning-line drive circuit 12 comprises vertical shift registers, while the signal line drive circuit 13 comprises sampling transistors, a split matrix and horizontal shift registers. The typical TFT has a gate width of 10 μm and a gate length of 30 μm, as its processing dimensions, in the case of a load MOS and has a gate width of 50 μm and a gate length 6 μm in the case of a drive MOS.

The active matrix board prepared in accordance with the present embodiment is used as a color liquid crystal display unit, as shown in FIG. 1B.

In FIG. 1B, thin film transistors 14 are formed in the vicinity of the intersections of signal electrodes 13 and scanning electrodes 12 on a glass substrate 10A to drive transparent pixel electrodes 11. Reference symbols 19A and 19B denote a signal circuit area and a scanning circuit area, respectively. Opposing transparent electrodes 16 and color filters 17 are formed on a glass substrate 10B opposed to the glass substrate 10A to sandwich a liquid crystal layer 14 of electrooptic material together with the substrate 10A. A pair of polarizing plates 18A and 18B are provided so as to sandwich the pair of glass substrates 10A and 10B. Thus, a thin film transistor (TFT) drive type color liquid crystal display unit is operated by adjusting the transmission of light received from a light source therethrough.

Figure 2:
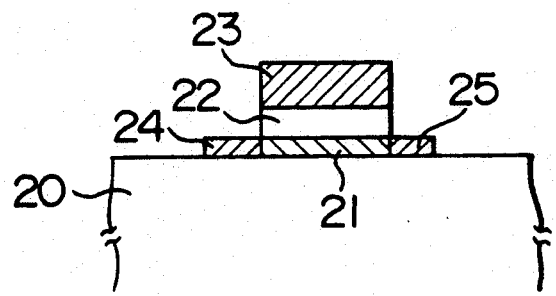
FIG. 2 shows, in a model form, a cross-sectional view of a structure of one of TFTs used in the embodiment of the present invention.

Shown in FIG. 2 in a model form is a sectional view of one of the TFTs in FIG. 1B. Each pixel TFT and each peripheral circuit TFT are different from each other in their plane dimensions (pattern). However, the same process can be employed to form the both TFTs.

A polycrystalline silicon film 21 of 60 nm thickness was formed on a glass substrate 20 by a low-pressure chemical vapor deposition (CVD) technique at a substrate temperature of 550° C., subjected to an annealing process in a nitrogen atmosphere of 600° C. for 20 hours, and then subjected to a photolithographic process for its patterning. As already explained above, the patterning size is different between the pixel TFT and the peripheral circuit TFT. Then, a silicon oxide film 22 as a gate insulating film of 120 nm thickness as well as a polycrystalline silicon film 23 as a gate electrode of a 200 nm thickness were deposited on the polycrystalline silicon film 21. The pattern is sized as mentioned earlier, that is, the minimum processing dimensions of the pixel TFT area are set to be smaller than those of the peripheral-circuit TFT area. Thereafter formed on the glass substrate 20 were a source region 24 and a drain region 25 by phosphorus ion implantation and annealing processes based on a self alignment process now widely employed. Subsequently, a transparent electrode of ITO (indium tin oxide) and an aluminum wiring layer were formed.

TABLE 1

| Characteristic | TFT Characteristics | |
|---|---|---|
| | Pixel Area TFT | Peripheral-Circuit-Area TFT |
| ON current (A) | $2 \times 10^{-5}$ | $4 \times 10^{-5}$ |
| OFF current (A) | $1 \times 10^{-11}$ | $4 \times 10^{-11}$ |
| Threshold voltage (V) | 7.5 | 7.5 |
| Source-drain breakdown voltage (V) | 22 | 28 |
| Carrier Mobility (cm$^2$/V.S) | 28 | 35 |

Table 1 shows Characteristics of the TFT prepared according to the above method. Values given in Table 1 are averages of values measured at 5 points per substrate and with respect to a total of 3 substrates. It will be seen from Table 1 that one of features of the pixel area TFT is the small off current, whereas, one of features of the peripheral-circuit-areas TFT is the high source-drain breakdown voltage and the large carrier mobility. The latter feature is based on the fact that the availability of the large TFT dimensions enables the prevention of local breakdown of the polycrystalline silicon film and the reduction of loss of the carrier mobility on the polycrystalline silicon layer. Desirably, the breakdown voltage is set at about 10-20 V for the pixel area TFT and at over about 30 V for the peripheral drive circuit TFT.

The present invention will next be explained by referring to FIG. 3 in connection with another embodiment wherein the invention is applied to a large-scale liquid crystal display unit having a display size of 14 inches (more accurately, measuring 268.8 mm × 187.2 mm and having a diagonal dimension of 12.9 inches).

With use of a glass substrate 30 having a size of 300 mm × 235 mm, a TFT panel incorporating a peripheral circuit was prepared in substantially the same manner as in the foregoing embodiment. In the panel, one pixel has a size of 240 μm × 80 μm, the total number of such pixels is 1120 × 780, each of TFTs in a pixel area 31 has a gate length of 50 μm and a gate width of 8 μm, each of TFTs in a peripheral circuit area 32 has a gate length of 50 μm and a gate width of 50 μm, a minimum wiring width is 10 μm for the both areas 31 and 32, and a pixel aperture ratio is 60.5%.

Figure 3:
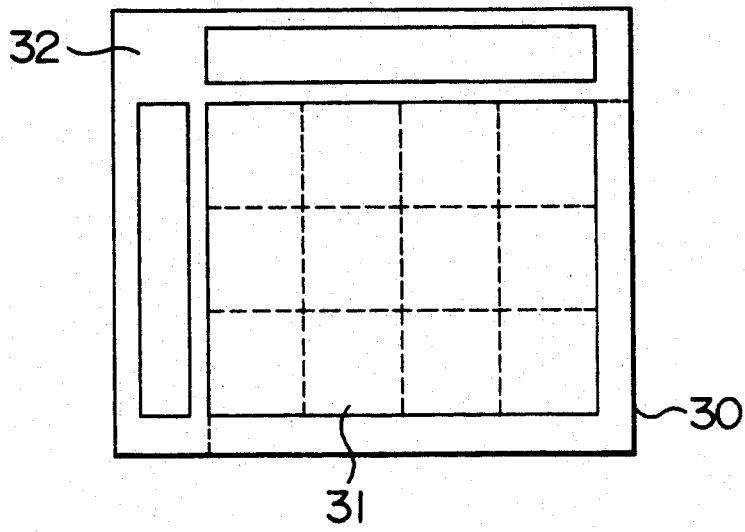
FIGS. 3 and 4 show, in a model form, a plan view of a TFT panel in accordance with another embodiment of the present invention and a locally enlarged view thereof, respectively.
Figure 4:
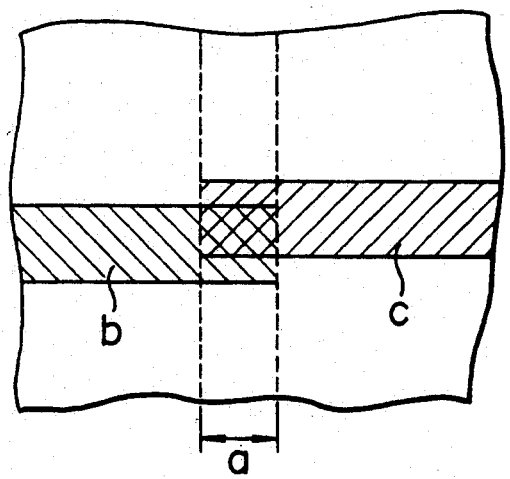

The manufacturing method of the present embodiment is substantially the same as that of the foregoing embodiment of FIGS. 1 and 2, except that, as shown in FIG. 3, the peripheral circuit area 32 (including a scanning-line drive circuit and a data-line drive circuit) was subjected to a batch light exposure while the pixel area 31 was subjected to 12 times of light exposure. More concretely, the scanning-line drive circuit and the data-line drive circuit were first subjected to a batch light exposure and then only the pixel area 31 was subjected to divisional light exposure with respect to such 12 divisions as shown by dotted lines. At this time, for the purpose of preventing the breaking of there scanning lines and data lines at the boundaries of the divisional exposure zones, such a method as explained in connection with FIG. 4 is employed. That is, the divisional exposure zones were light-exposed as overlapped by 10 μm (a in FIG. 4) that is the same as a wiring width W with use of negative type photo resist. As a result, of both an ultraviolet-ray irradiation part (shown by a hatched area b) for the first divisional exposure and another ultraviolet-ray irradiation part (shown by a hatched area c) for the second divisional exposure, an area subjected to ultraviolet ray irradiation at least once can keep the photo resist remaining thereon, thus preventing any wire breaking. Since an overlapped zone of the both ultraviolet-ray irradiation parts doubly subjected to the ultraviolet ray irradiation is surrounded substantially by usual ultraviolet-ray irradiation zones subjected only once to the ultraviolet ray irradiation, this will adversely affect a pattern accuracy. For this reason, good wiring connections were able to be realized without paying any special consideration to the configuration of the wiring pattern.

That is, the use of the present manufacturing method enabled formation of a highly accurate pattern even for a large-scale board.

In the present embodiment, pixel division was tried to improve the yield of the TFT panel. In addition, for the purpose of improving the TFT characteristics, in particular, reducing the OFF current, a divided-gate structure (multi-gate structure) was employed for the TFT.

Figure 5:
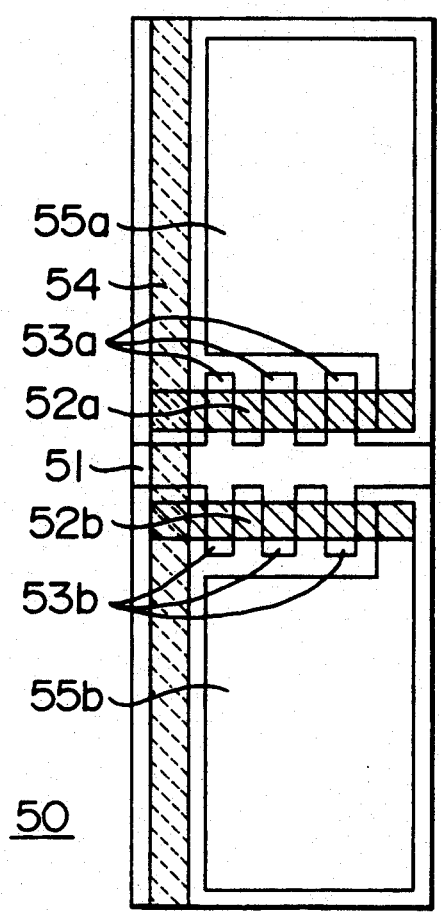
FIG. 5 shows, in a model form, a plan view of a pixel in a liquid crystal display device in accordance with a further embodiment of the present invention.

There is shown a plane pattern based on the pixel division in FIG. 5, wherein one pixel 50 is divided by a scanning line 51 into two upper and lower zones in which TFTs 52a and 52b are provided respectively. With such a structure, even when one of the TFTs becomes defective, ½ of the entire area of the pixel can be turned ON and OFF to thereby avoid its noticeable defective state. Gate electrodes 53a and 53b of the TFTs 52a and 52b are also divided respectively into three gate sub-electrodes separated by a pitch of 8 μm therebetween. Reference numeral 54 denotes a data line common to the both TFTs 52a and 52b, and 55a and 55b denote transparent electrodes of ITO (indium tin oxide) connected to respective source zones of the TFTs. With this structure, one pixel 50 can have an aperture ratio of 49.7% and thus practically sufficient brightness can be realized. Further, because of the divided-gate structure (multi-gate electrode structure), the off current can be reduced to half so that there can be a liquid crystal display unit which is small in the brightness variations of the display screen and provides a high quality of image.

The present invention may be applied not only to the TFTs in the pixel area and peripheral circuit of the liquid crystal display unit but also to various sorts of sensors integrally formed in a process of manufacturing a driver circuit of a combination of a sensor part and its driver part, for example, to an image sensor, a pressure sensor utilizing the piezo-resistive effect of single-crystal silicon, a thermally recording head or the like. The present invention is suitable, in particular, for a large-area display board having many elements integrally built therein.

Figure 6:
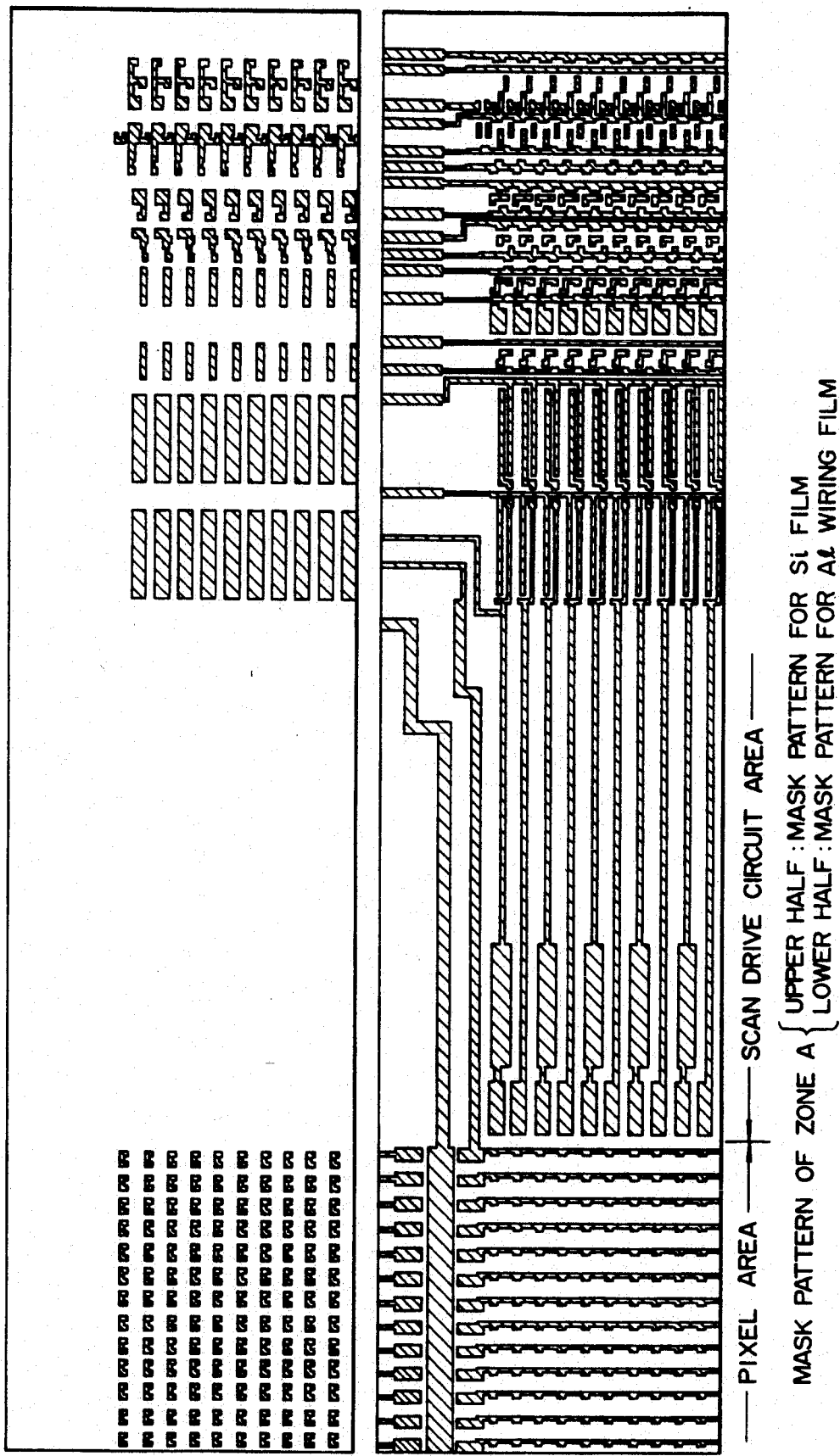
FIGS. 6 and 7 are plan views for explaining patterns formed on a substrate.
Figure 7:
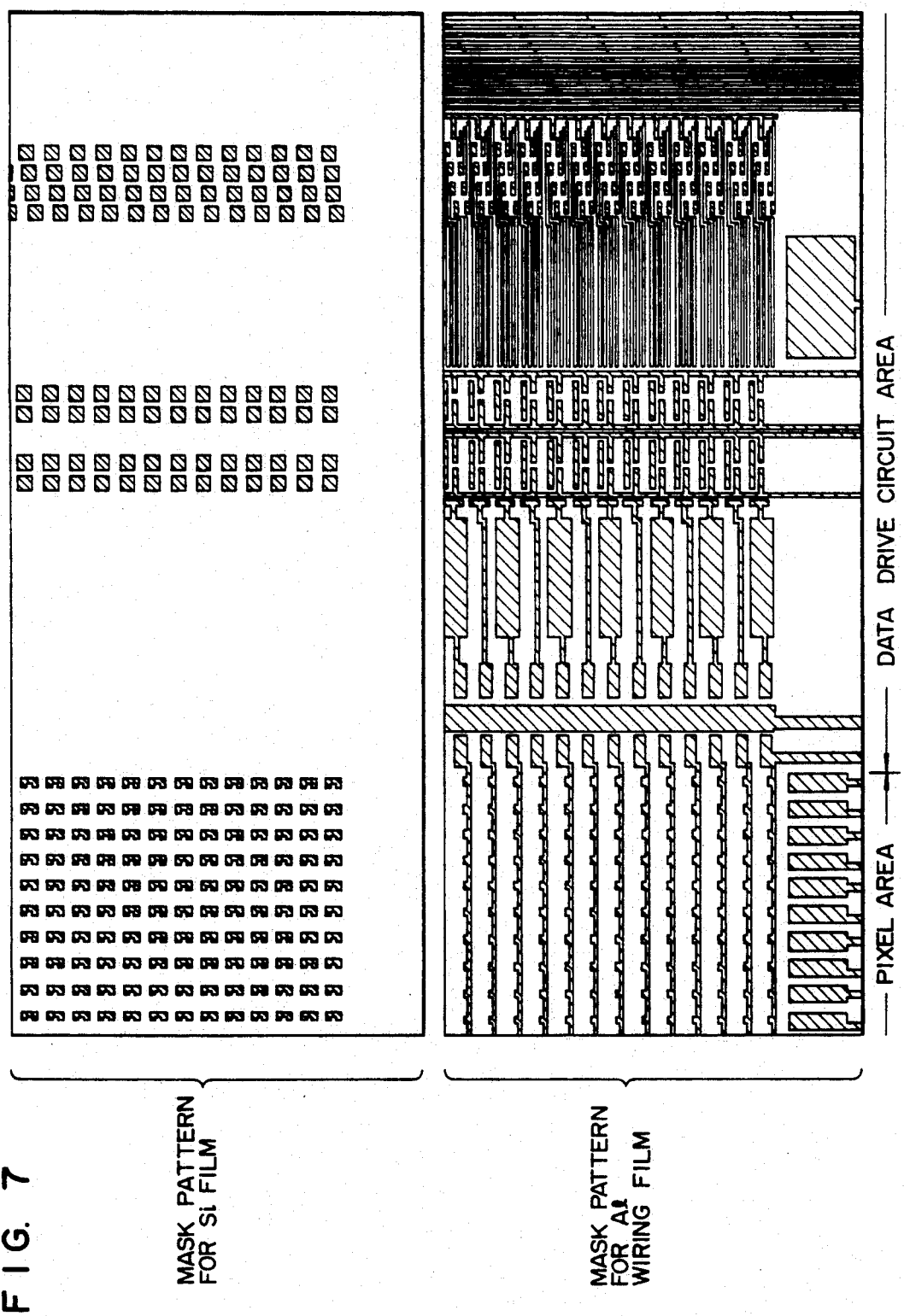

FIGS. 6 and 7 are plane patterns of photo masks which are different in the pattern size between a pixel area and a peripheral circuit area in a large-scale display (LCD) panel of the TFT type. It will be seen from the drawings that the size of Si islands and the width of Al wires are clearly different between the pixel area and the peripheral circuit area.

More in detail, FIG. 6 shows the pattern of a zone A in FIG. 1C while FIG. 7 shows the pattern of a zone B in FIG. 1C.

The present invention has many features including the following.

1. In an active matrix panel of a liquid crystal display apparatus having a peripheral driver circuit incorporated in the same substrate of a screen (display) size of several or more inches, the processing dimensions of transistors in the pixel area are set to be smaller than those in the peripheral driver circuit area.

2. In the active matrix panel of the liquid crystal display apparatus having a peripheral driver circuit incorporated in the same substrate, the breakdown voltage of transistors in the peripheral driver circuit area is set to be larger than that in the pixel area.

3. In the active matrix panel of the liquid crystal display apparatus having a peripheral driver circuit incorporated in the same substrate, the leakage current of transistor in the pixel area is set to be smaller than that in the peripheral driver circuit area.

4. The thin film transistor is made of mainly polycrystalline silicon.

5. In a method of manufacturing a thin film transistor panel, the peripheral driver circuit area is subjected to a batch light exposure process while the pixel area is subjected to a divisional light exposure.

6. Interconnections between wiring lines in the vicinity of the boundaries of the divisional light exposure zones are achieved through exposure of the zones with their wiring width dimensions overlapped with use of negative type photo resist.

7. The thin film transistor panel is used to form a liquid crystal display apparatus.

In accordance with the aforementioned embodiment, the peripheral circuit area and pixel area of the active TFT matrix panel of liquid crystal display can be formed into respectively suitable arrangements without involving any increase in the number of steps in the manufacturing method. As a result, there can be realized the formation of a high definition panel, the accurate formation of a large-scale panel and the improvement of yield based on the application of a redundancy system.

For TFTs for use in an LCD, if a single defect exists in a single substrate, then the substrate is regarded as a rejection.

Meanwhile, for a large scale integrated (LSI) circuit, since a single Si wafer is pelletized into small sizes, even when a defect exists in the single wafer, only the pellet having the defect is rejected as defective and the other pellets can be used as acceptable.

For this reason, the redundancy system of (1) preventing defects and (2) allowing the operation of the panel even in case of any defects, is employed in the present invention.

In an example of the redundancy system:

a) A plurality of TFTs are prepared for a single pixel. Thus, even when a single defect exists in the TFTs, the other TFTs can be operated and a normal image can be provided.

b) Even when a breaking takes place in wiring lines, this can be eliminated by means of double wiring.

c) A short-circuiting between gate and drain electrodes causes a cruciferous defect (all the pixels in the corresponding one row and one column becomes defective) to occur. However, this can be replaced by only one dot defect (only one pixel) in place of the defection of all the pixels, by inserting a resistor having a suitable resistive value between the gate line and the gate electrode.

In the present invention, the differentiation of the pattern accuracy enables easy employment of the above redundancy conception.

Supplemental explanation will be made as to terms used herein.

The term "processing dimensions" include the size (gate width, gate length) of Si islands for TFTs, the width (e.g., b and c in FIG. 4) of wiring layers, fine-patterning size (the width of source and drain regions in FIG. 2).

The term "breakdown voltage" refers to the breakdown voltage between the source and drain of an MOS type TFT (factors determining the breakdown voltage including the size (gate length), thickness, impurity concentration and so on of Si islands).

"The same substrate" refers to a glass substrate used as the initial starting material in the TFT process and corresponds to an Si wafer in the LSI process.

When a substrate is disposed adjacent to another substrate or these substrates are attached together, TFTs in the different substrates can be prepared by different processes. This is different from the term "incorporating" which means that elements are unitarily formed on the substrate by the same process.

The "leakage current" refers to the off current of a TFT which is a current flowing between the source and drain when a gate voltage (a negative biasing voltage for n channel) is applied to the TFT.

The "batch light exposure" refers originally to a method for carrying out a single time of alignment and light exposure with respect to the whole surface of a piece of substrate with use of a piece of photo mask; while the "divisional light exposure" refers to a method for carrying out a plurality of timers of alignment and light exposure with respect to the whole surface of the substrate.

In the present embodiment, the peripheral circuit area is subjected to a single time of alignment and light exposure, while the pixel area is subjected to a plurality of times of alignment and light exposure.

The "wiring width" means the width of a scanning bus line and a signal bus line.

Prior to explanation of other embodiments with reference to FIGS. 8 to 12, the basic conceptions of these embodiments will first be explained.

Figure 10A:
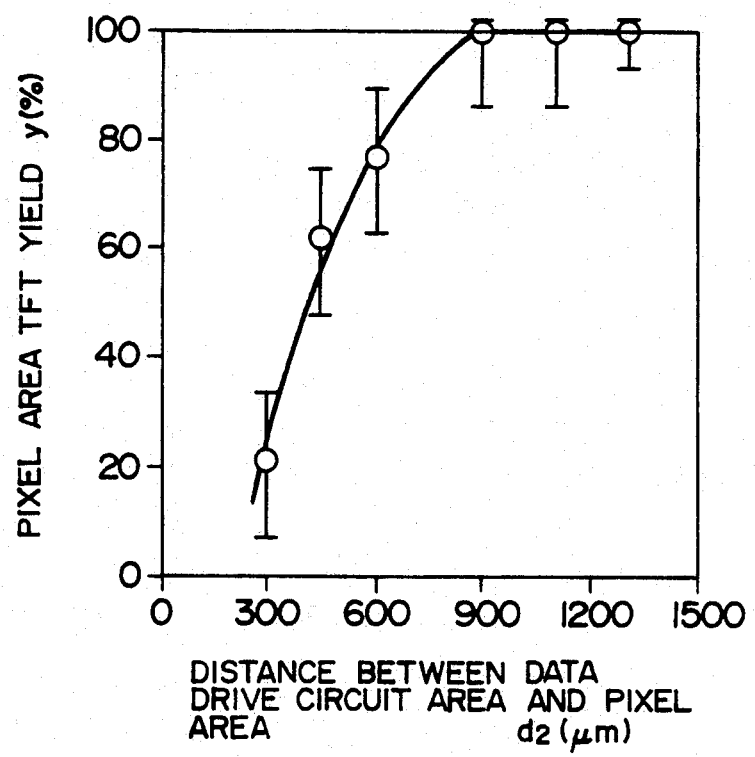
FIG. 10A is a graph showing a correlation between the TFT yield of a pixel area and a distance between a signal drive circuit area and the pixel area.
Figure 10B:
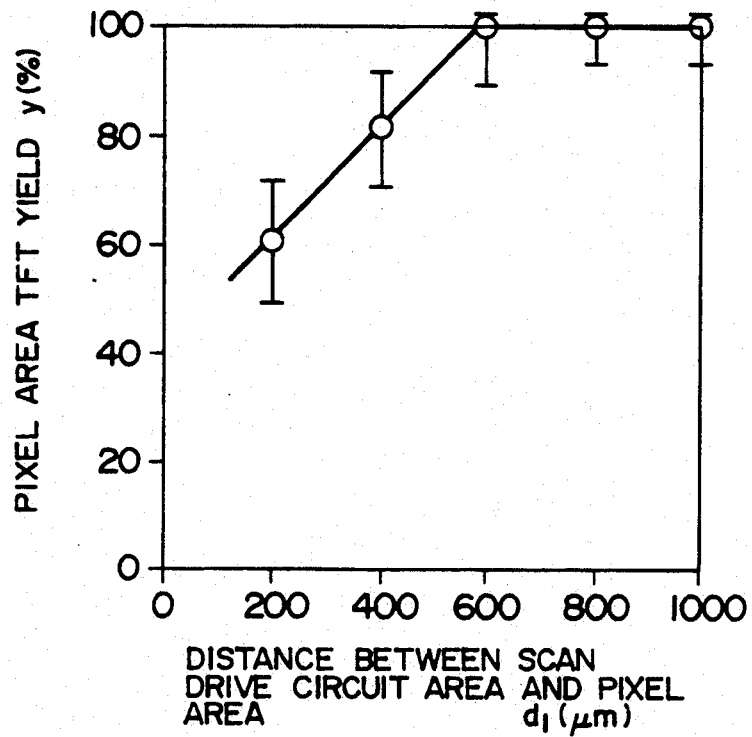
FIG. 10B is a graph showing a correlation between the TFT yield of the pixel area and a distance between a scan drive circuit area and the pixel area.

In comparison between a scan drive circuit and a signal drive circuit, it is generally required that the signal drive circuit be operated at a speed higher by about one figure than the scan drive circuit. Thus, the carrier mobility of transistors making up the signal drive circuit must be larger by about one figure than that of the scan drive circuit. In other words, the crystallizability of the transistor active area made of usually polycrystalline silicon in the signal drive circuit must be far higher than that in the scan drive circuit. Therefore, it is necessary to fabricate the data drive circuit at a high temperature above about 900° C. Meanwhile, the transistors of the display part are often made of amorphous silicon. Amorphous silicon forms a film at temperatures below 300° C. When the temperature of the amorphous silicon film formed at temperatures below 300° C. is reduced to temperatures above 300°, hydrogens contained in the film are gone and thus the transistor characteristics are deteriorated. That is, since the signal drive circuit and the pixel area are different in allowable fabricating temperature, this fabricating temperature difference causes an abrupt temperature gradient between the both. In order to lessen the effect of the temperature, the data drive circuit must be separated from the pixel area by a large distance. FIG. 10A shows measurement results of a relationship of the yield of the pixel area TFTs with respect to the distance between the data drive circuit and pixel area. In the measurement of FIG. 10A, an excited dimmer (excimer) laser beam having a wavelength of 308 nm was used to irradiate 320 mJ/cm$^2$ of energy. This energy has substantially the same annealing effect as the thermal annealing at 900° C. The film thickness is 2500 Å. The yield of the display unit may be considered to be the yield of the pixel area TFTs. It will be noted from the drawing that as the distance between the data drive circuit and the pixel area increases, the yield of the pixel area TFTs increases and when the distance exceeds 900 $\mu$m, the TFT yield of the pixel area becomes about 100%. That is, it is desirable that the distance between the data drive circuit and the pixel area exceed 900 $\mu$m, the TFT yield of the pixel area becomes about 100%. That is, it is desirable that the distance between the data drive circuit and the pixel area exceed 900 $\mu$m. Meanwhile, the scan drive circuit is not required to operate at a speed as high as the signal drive circuit and thus about 300° C. is sufficient for the film formation of polycrystalline silicon. In other words, a fabricating temperature difference between the scan drive circuit and the pixel area is merely about 300° C. and therefore a distance between the scan drive circuit and pixel area is not required to be as large as a distance between the signal drive circuit and pixel area. FIG. 10B shows measurement results of a relationship of the yield of the pixel area TFTs with respect to the distance between the scan drive circuit and pixel area. It will be seen from the drawing that, as the distance between the scan drive circuit and pixel area increases, the TFT yield of the pixel area increases and when the distance exceeds 600 $\mu$m, the TFT yield of the pixel area becomes about 100%. That is, 600 $\mu$m or more is sufficient for the distance between the scan drive circuit and the pixel area. In the measurement of FIG. 10B, an excimer laser beam was used to irradiate 240 mJ/cm2. The energy has substantially the same effect as the thermal annealing at 600° C.

Meanwhile, a display unit has usually a rectangular shape, the distance from the center of the display panel to the scan drive circuit is larger than the distance from the center of the display panel to the data drive circuit. Thus, the use of a large-area glass substrate results often in that the yield of the scan drive circuit itself is lower than the yield of the data drive circuit and therefore it is of urgent necessity to increase the yield of the scan drive circuit. To this end, it is necessary to dispose the scan drive circuit as close to the pixel area as possible. That is, the distance between the scan drive circuit and the pixel area is required to be smaller than the distance between the data drive circuit and the pixel area.

In the case where the size of the display part is relatively small or the number of pixels is small, the scan drive circuit may be formed not by the laser annealing method but by an amorphous silicon transistor fabricating method.

In addition to the above problem in manufacturing the display unit, there is another problem of heat generation caused by the driving operation of the peripheral circuit. That is, since the data drive circuit, in particular, requires a relatively large power consumption, the data drive circuit is locally heated to high temperature. Accordingly, when the data drive circuit is disposed closer to the pixel area, the operating life of liquid crystal of the pixel area can be shortened. However, the influence of this problem can be lessened to a negligible extent by spacing the signal drive circuit from the pixel area by 900 $\mu$m or more, as already mentioned above. Meanwhile, the power consumption of the scan drive circuit is not as large as that of the data drive circuit and produces less heat. Therefore, 600 μm or more is sufficient for a distance between the scan drive circuit and the pixel area. In this way, the above distance restriction is also influenced by the heat generation problem of the peripheral circuit area.

The expression "the distance of from the scan drive circuit and the data drive circuit to the pixel area" refers to shortest one of distances in the directly connected wires between the transistor active silicon zone of the peripheral circuit and the transistor active silicon zone of the pixel area. In the case where distances in a multiplicity of wires connected between the scan or signal drive circuit and the pixel area are irregular, major one of the wire distances is vital. This major wire distance can be usually approximated in terms of the respective average distances of the scan and signal drive circuits. Since heat is propagated from the peripheral circuit area to the pixel area mainly along the glass surface, it is independent of the thickness of the glass substrate and also not substantially influenced by the type (component) of the glass substrate.

In accordance with the technical idea or subject matter of the present invention, since the peripheral circuit can be formed on the liquid crystal substrate by the same process as in the formation of the pixel area TFTs, the pixel size can be reduced without involving a high-density wiring lead problem. As a result, high definition display can be realized.

Figure 8:
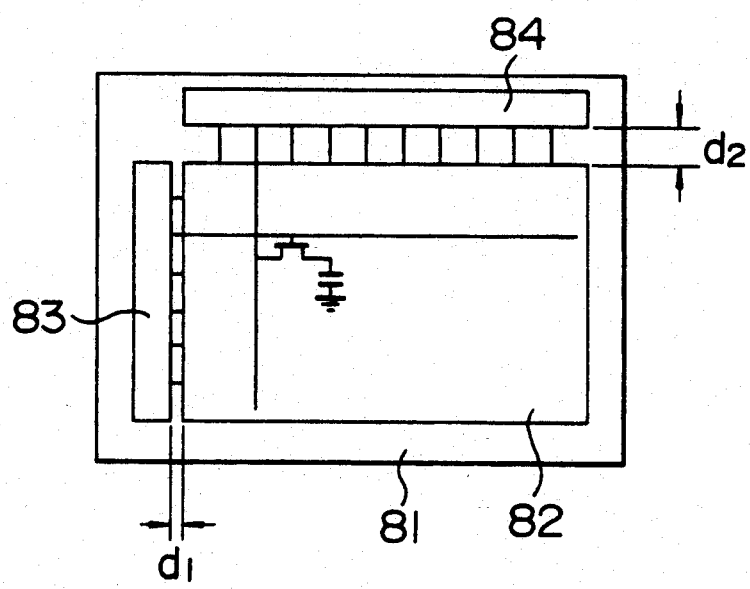
FIG. 8 is an arrangement of a liquid crystal display device in accordance with other embodiment of the present invention.
Figure 9:
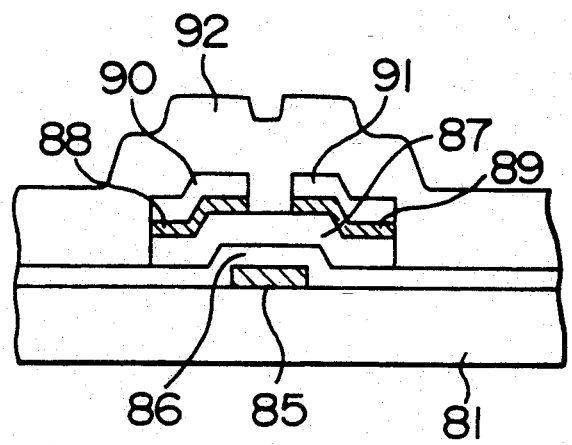
FIG. 9 is a cross-sectional view of a thin film transistor used in FIG. 8.
Figure 11:
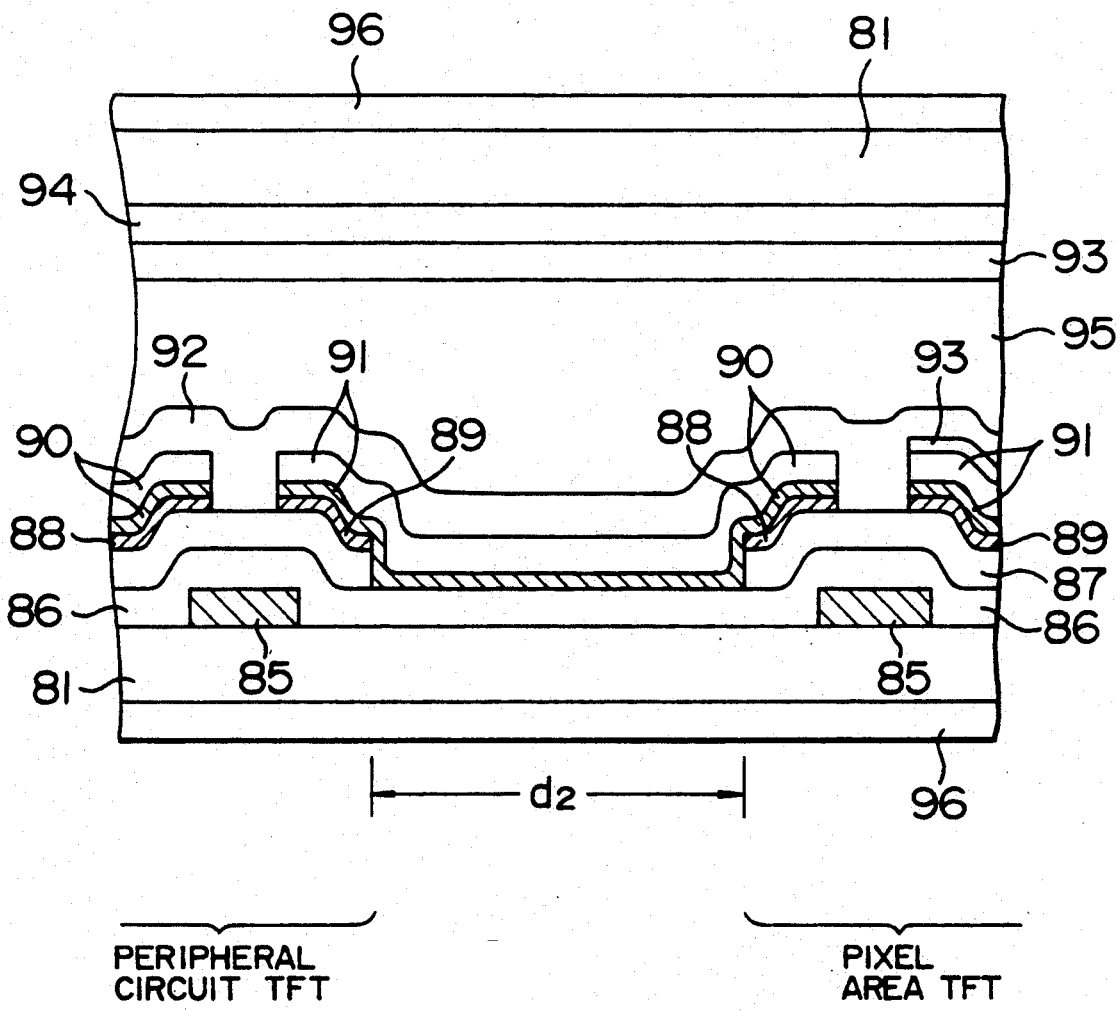
FIG. 11 shows, in a model form, a cross-sectional view of a major part of the liquid crystal display device of the embodiment of FIG. 8.

Explanation will be made as to a liquid crystal display unit in accordance with an embodiment of the present invention by referring to FIGS. 8, 9 and 11. More specifically, FIG. 8 shows, in a model form, a planar structure of the liquid crystal display unit which includes a pixel or display area 82, a scan drive circuit area 83 and a data (signal) drive circuit area 84, all formed on a glass substrate 81. FIG. 9 shows a cross-sectional view of a part of a structure of TFTs built in the display and other areas. FIG. 11 shows, in a model form, a cross-sectional view of the liquid crystal display unit according to the present embodiment, wherein a glass substrate (having a strain temperature of about 600° C.) with a diagonal dimension of 12 inches is used. A Cr gate electrode 85 is first formed by a sputtering process, and then a gate insulating film 86 of SiN material and i film (layer) 87 of amorphous silicon are formed by a plasma CVD process. These films 86 and 87 have thicknesses of 3000 Å and 2500 Å. Subsequently, the peripheral circuit formation area in FIG. 8 is subjected to an annealing process with use of a XeCl excimer laser beam (having a wavelength of 308 nm) to convert the amorphous silicon into polycrystalline silicon. In this case, the irradiation intensity of the laser beam is 240 mJ/cm$^2$ for the scan drive circuit area 83 and 320 mJ/cm$^2$ for the signal drive circuit area 84. These laser energies have the same effect as the thermal annealing at temperatures of about 900° C. and about 600° C., respectively. Next, an amorphous silicon film (n+layer) source region 88 doped with phosphorus and a drain region 89 are deposited by the plasma CVD process. Transistor island zones are formed by a photo-lithography process and then a source electrode 90 of a wiring Cr electrode film and a drain electrode 91 are formed by the sputtering process.

Subsequently, the source region 88 and the drain region 89 are formed by the photo-lithography process, a transparent electrode 93 of an ITO film is formed and then subjected to the photo process for its sputtering. A passivation film 92 of SiN is formed by the plasma CVD process. Finally, liquid crystal 95 are sealed within a space between the passivation film 92 and another piece of glass substrate 81 provided with a polarizing plate 96 and a color filter 94. At this stage, a display unit is completed. In the present display unit, the number of scan lines in the scan drive circuit of the peripheral circuit is 640 while the number of TFTs in the data drive circuit of the peripheral circuit is 1440. And a distance $d_2$ between the pixel area and the signal drive circuit is 950 μm and a distance $d_1$ between the pixel area and the scan drive circuit is 600 μm. It will be appreciated that the yield of the TFTs in the pixel area of the present display unit is about 100% and thus much improved than about 80% of yield when the present invention is not used.

Figure 12A:
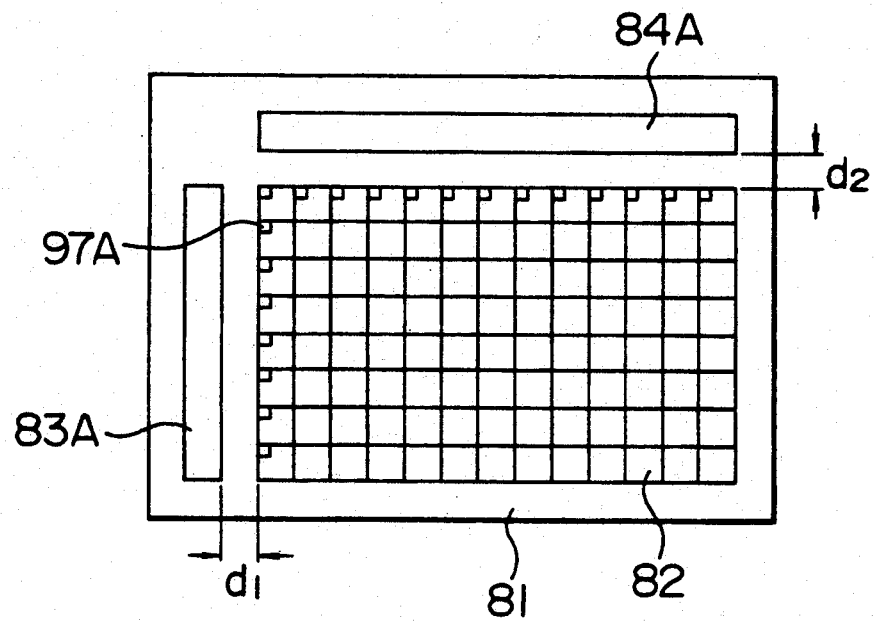
FIGS. 12A and 12B show an arrangement of the liquid crystal display device of the embodiment and an arrangement of a modification of the embodiment.
Figure 12B:
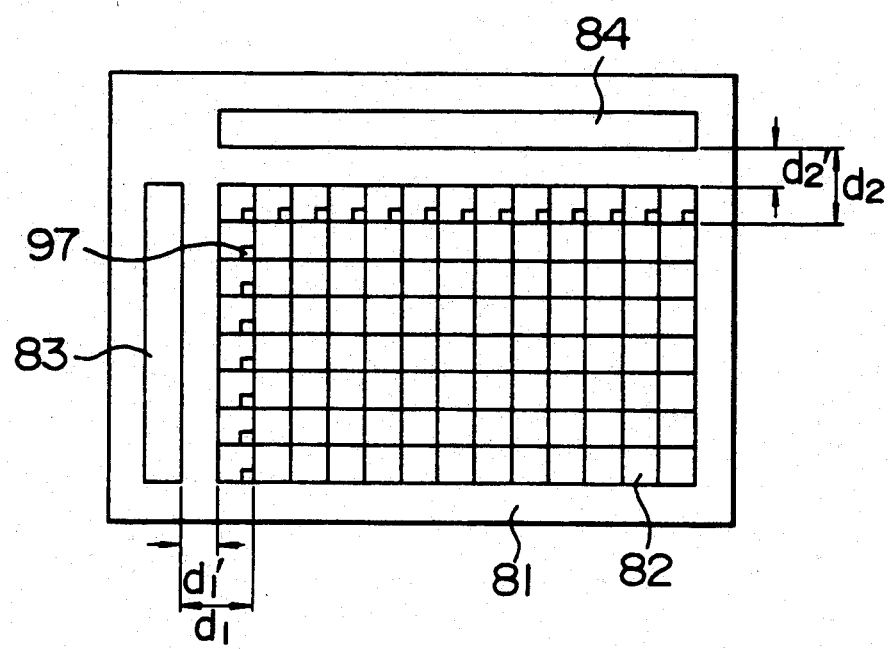

FIGS. 12A and 12B show the foregoing embodiment and its modification of the foregoing embodiment respectively. In the modification, pixel driving TFTs 97 of pixels adjacent to the peripheral circuit are positioned within the associated pixels and adjacent to associated intersections of that two sides of the adjacent pixels located relatively far away from the scan drive circuit 83 and the data drive circuit 84. It will be appreciated that the dimensions $d_1$ and $d_2$ in the modification of FIG. 12B can be both shortened by an amount corresponding to one side of the pixel than those in the embodiment of FIG. 12A.

What is claimed is:

1. A display device comprising:
    at least one substrate;
    a plurality of semiconductor elements formed on said substrate; and
    a display member controlled by said plurality of semiconductor elements;
    wherein said substrate is divided into a display zone and a non-display zone other than said display area, said plurality of semiconductor elements are formed in said display zone and said non-display zone, and minimum processing dimensions of the semiconductor elements formed in the display zone are differently set to be smaller than minimum processing dimensions of the semiconductor elements formed in the non-display zone.

2. A display device as set forth in claim 1, wherein said semiconductor element is a thin film transistor.

3. A display device as set forth in claim 1, wherein said semiconductor element is a thin film transistor of a polycrystalline silicon active layer.

4. A display device as set forth in claim 1, wherein said semiconductor elements formed in said display zone are thin film transistors of an amorphous silicon active layer.

5. A display device as set forth in claim 1, wherein said semiconductor elements formed in said non-display zone are thin film transistors of a polycrystalline silicon active layer.

6. A display device comprising:
    at least one substrate, said substrate being divided into a display zone and a non-display zone other than said display area;
    a plurality of semiconductor elements formed on said substrate, said plurality of semiconductor elements being formed in said display zone and said non-display zone;
    a display member controlled by said plurality of semiconductor elements; and
    differentiation means for setting a breakdown voltage of the semiconductor elements formed in the non-display zone to be larger than a breakdown voltage of the semiconductor elements formed in the display zone.

7. A display device comprising:
at least one substrate, said substrate being divided into a display zone and a non-display zone other than said display area;
a plurality of semiconductor elements formed on said substrate, said plurality of semiconductor elements being formed in said display zone and said non-display zone;
a display member controlled by said plurality of semiconductor elements; and
means for setting a leakage current of the semiconductor elements formed in the display zone to be smaller than a leakage current of the semiconductor elements formed in the non-display zone.

8. A display panel comprising:
at least one substrate; and
a plurality of semiconductor elements formed in said substrate;
wherein said substrate is divided into a display zone and a non-display zone other than said display zone, said plurality of semiconductor elements are formed in said display zone and said non-display zone, minimum processing dimensions of the semiconductor elements formed in the display zone are set to be smaller than minimum processing dimensions of the semiconductor elements formed in the non-display zone.

9. A liquid crystal display device comprising:
liquid crystal sealed between transparent substrates;
transparent electrodes for driving said liquid crystal forming a pixel area;
thin film elements formed within said pixel area for respective pixels to apply voltages to said transparent electrodes; and
a peripheral circuit made up of thin film transistors for driving the thin film elements of the pixels formed on the same substrate;
wherein said peripheral circuit includes a data drive circuit area for giving a display instruction and a scan drive circuit area, and a distance between said data drive circuit area and pixel area is set to be larger than a distance between said scan drive circuit area and said pixel area on the substrate.

10. A liquid crystal display device as set forth in claim 9, wherein at least one of said scan drive circuit area and said data drive circuit area is formed by a laser annealing process.

11. A liquid crystal display device as set forth in claim 9, wherein a glass substrate is used as said substrate.

12. A liquid crystal display device as set forth in claim 9, wherein the transistors of said pixel area are made of amorphous silicon while the transistors of said data drive and scan drive circuit area are made of polycrystalline silicon.

13. A liquid crystal display device as set forth in claim 9, wherein energy of a laser beam to be irradiated to said data drive circuit area is larger than that to said scan drive circuit area.

14. A liquid crystal display device as set forth in claim 9, wherein crystallizability of an active layer of said data drive circuit area is more improved than that of said scan drive circuit area.

15. A liquid crystal display device as set forth in claim 9, wherein ones of the pixel-driving thin film transistors of said pixels within said pixel area and adjacent to said peripheral circuit are positioned within the pixels as contacted with at least one of sides of the pixels located relatively away from said scan drive circuit area and said data drive circuit area.

16. A liquid crystal display device comprising:
liquid crystal sealed between transparent substrates;
transparent electrodes for driving said liquid crystal forming a pixel area;
thin film elements formed within said pixel area for respective pixels to apply voltages to said transparent electrodes; and
a peripheral circuit for driving said thin film elements of the pixels which includes a signal drive circuit are for giving a display instruction and a scan drive circuit area;
wherein at least said signal drive circuit area is formed on the same substrate, and a distance between said signal drive circuit area and said pixel area is set to be 900 $\mu$m or more.

17. A liquid crystal display device as set forth in claim 16, wherein a distance between said scan drive circuit and said pixel area is set to be 600 $\mu$m or more.

18. A liquid crystal display device as set forth in claim 16, wherein the transistors of said pixel area are made of amorphous silicon while the transistors of said signal drive circuit area and said scan drive circuit area are made of polycrystalline silicon.

19. A liquid crystal display device as set forth in claim 16, wherein energy of a laser beam to be irradiated to said signal drive circuit area is larger than that to said scan drive circuit area.

20. A liquid crystal display device as set forth in claim 16, wherein crystallizability of an active layer of said signal drive circuit area is more improved than that of said scan drive circuit area.

21. A liquid crystal display device as set forth in claim 16, wherein ones of the pixel-driving thin film transistors of said pixels within said pixel area and adjacent to said peripheral circuit are positioned within the pixels as contacted with at least one of sides of the pixels located relatively away from said scan drive circuit area and said signal drive circuit area.

22. A liquid crystal display device comprising:
liquid crystal sealed between transparent substrates;
transparent electrodes for driving said liquid crystal forming a pixel area;
thin film elements formed within said pixel area for respective pixels to apply voltages to said transparent electrodes; and
a peripheral circuit for driving said thin film elements of the pixels which includes a signal drive circuit area for giving a display instruction and a scan drive circuit area;
wherein at least said scan drive circuit area is formed on the same substrate, and a distance between said scan drive circuit area and said pixel area is set to be 600 $\mu$m or more.

23. A liquid crystal display device as set forth in claim 22, wherein at least said signal drive circuit area is formed by a laser annealing process.

24. A liquid crystal display device as set forth in claim 23, wherein a glass substrate is used as said substrate.

25. A display device comprising:
at least one substrate, said substrate being divided into a display zone and a non-display zone other than said display zone;
a plurality of semiconductor elements formed on said substrate, said plurality of semiconductor elements being formed in said display zone and said non-display zone;

a display member controlled by said plurality of semiconductor elements; and differentiation means for setting a carrier mobility of said semiconductor elements formed in said non-display zone to be larger than a carrier mobility of said semiconductor elements formed in the display zone.

* * * * *